United States Patent [19]

Lube

[11] 4,212,656
[45] Jul. 15, 1980

[54] SMOKE SCRUBBING APPARATUS

[76] Inventor: John G. Lube, 39 Springton Rd., Upper Darby, Pa. 19082

[21] Appl. No.: 966,004

[22] Filed: Dec. 4, 1978

[51] Int. Cl.² ............................................. B01D 45/08
[52] U.S. Cl. ........................................ 55/217; 55/228; 55/257 NP; 55/260; 55/267
[58] Field of Search ...................... 261/118; 55/80, 85, 55/91, 94, 217, 228, 257 NP, 260, 263, 267, 270; 23/313 R

[56] References Cited

U.S. PATENT DOCUMENTS

| 704,199 | 7/1902 | Lee | 55/263 |
|---|---|---|---|
| 2,186,125 | 1/1940 | Roberts | 55/263 |
| 2,922,489 | 1/1960 | Hollingsworth | 55/217 |
| 3,532,595 | 10/1970 | Arnesjo et al. | 55/80 |

*Primary Examiner*—Frank Sever

*Attorney, Agent, or Firm*—Arthur E. Oaks; Robert S. Lipton

[57] ABSTRACT

A smoke scrubbing system is provided to remove both solid particulate and soluble acidiferous gas contamination from power station and incinerator smoke stacks. In use it comprises a series of consecutive hydration chambers wherein the stack gas is treated with low pressure steam which results in particle agglomeration to the point where it can act as condensation seeds thus facilitating its subsequent removal from the gas followed by a series of water wash chambers wherein the hydrated agglomerated solids and soluble acidiferous gases are scrubbed or removed from the stack gas. The system economics are enhanced by an integral steam generator to capture waste heat from the stack gases. Additionally, filtration means are provided to remove solid contaminents from the waste water so that the water will not become polluted and can be reused in the system, if desired.

8 Claims, 1 Drawing Figure

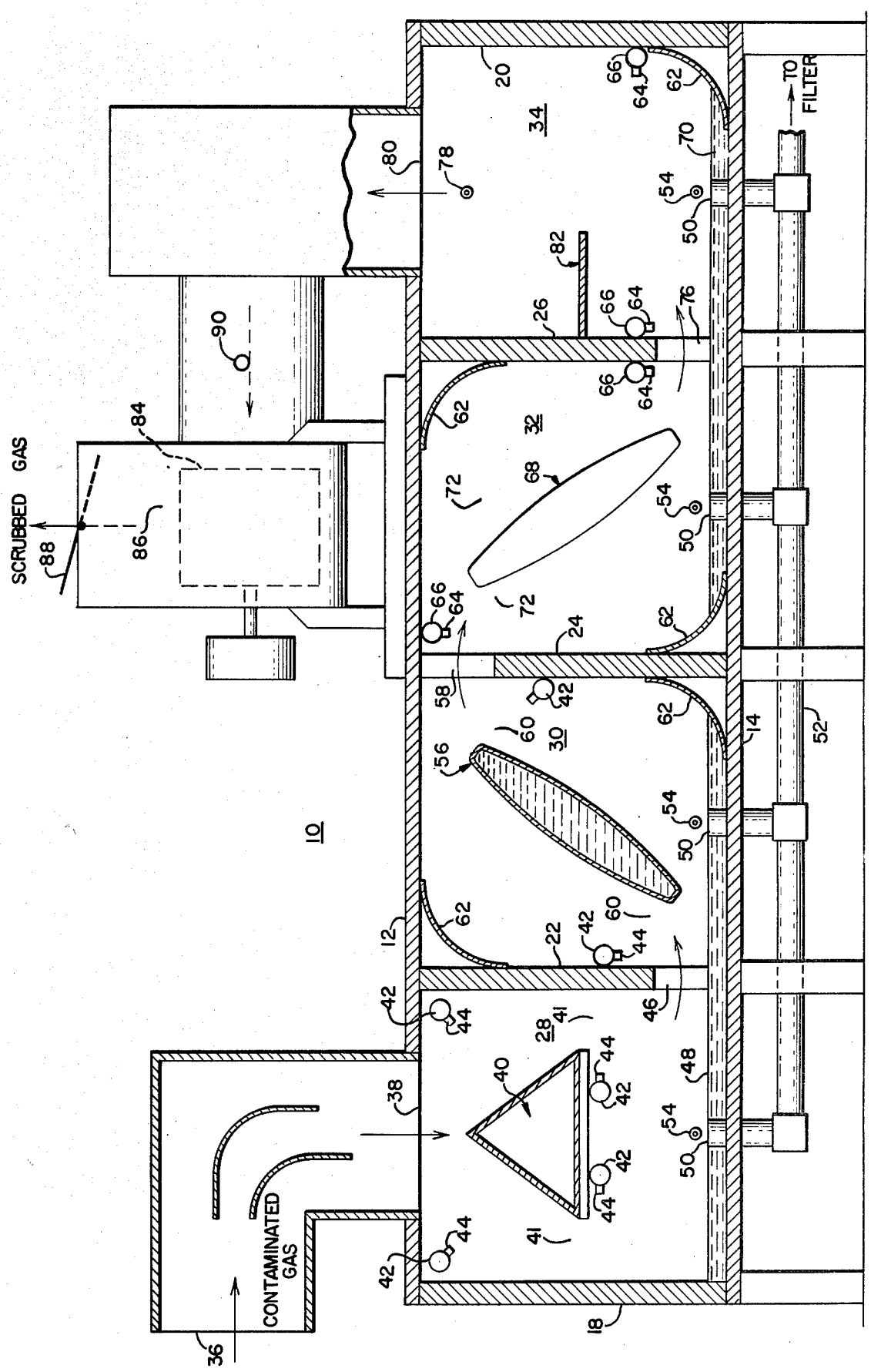

4,212,656

SMOKE SCRUBBING APPARATUS

BACKGROUND OF THE INVENTION

1. Field of the Invention

This invention relates generally to an apparatus for reducing air pollution caused by solid particles and soluble gases in the fumes and exhausts from incinerators and industrial smoke stacks.

It is well known that fumes and exhausts coming from municipal incinerators, coal burning power stations and many chemical and metallurgical processing plants are major sources of air pollution. This is because they often contain contaminents such as soot resulting from incomplete combustion, fly ash and other solids, ammonia, cyanogen, hydrogen sulfide and the acid oxides of sulfur and nitrogen. The gases in addition to causing significant problems with their distinctive odors are, in sufficient concentrations, major health hazzards causing such problems as eye irriatation and respiratory illness and seriously aggravating cardiovascular illness. In addition the acid gases, on being hydrated by natural moisture, form an "acid" rain which is quite corrosive to many unprotected metals and marble stone structures. The solid particles in addition to causing major cleaning problems in many urban areas have been known to act as cloud seeds causing unexpected or excessive amounts of rain or snow to precipitate in regions downstream from the stack.

As a result of all this, there has been a significant effort made to greatly reduce, if not eliminate, all solid and soluble gas contamination in these exhausts. Over the years a number of devices have been developed for this purpose. For gas extraction, however, the most efficient methods require packed towers and careful control of both the physical and thermodynamic parameters for maximum efficiency. Thus, where large volumes of dilute gas such as incinerator exhausts are encountered, such devices are prohibitively expensive and, because of the significant solids content in the gas, loose their effectiveness quite rapidly.

Most devices for the removal of solids are primarily designed to remove dusts and mists having sizes down to approximately 0.1 micron. Here, too, there are a number of specialized systems which are effective but these carry the problems of requiring frequent cleaning if efficiency is not to be impaired and, of course, they are completely ineffective with gaseous contamination.

SUMMARY OF THE INVENTION

What is needed is a gas scrubbing system which is effective against both solid and gaseous contamination and which can operate continuously in a cost effective manner. The present invention is designed to meet this need. As designed the exhaust fumes or smoke being treated are first scrubbed with moist steam to hydrate and agglomerate the solid particles and acid gases. This also tends to hydrolyze and destroy odor bearing materials such as distilled mercaptans and other sulfur bearing compounds in the smoke. The hydrated smoke is then quenched with a fluid such as water which washes out all solids, the hydrated acid gases and the hydrolyzed odiferous compounds.

The cooled cleaned gases are then blown out of the stack while the quench water is filtered to remove the solids, thus allowing for continuous operation. Since many of the solids are basic oxides, they tend to react with the dissolved acids present so the quench water can often be recovered with only minor levels of acidity present. When such is the case it can be reused either as is or with the addition of only a small amount of base such as alumina or sodium hydroxide to achieve neutrality.

In many applications, the filtered solids contain an appreciable quantity of combustable material which after drying can be used as fuel for the stream generator or sent back to the incinerator for further reduction. When used for steam generation, the availability of this "fuel" can represent a significant cost saving as well as energy conservation factor.

A second source of economy can be achieved by diverting some of the quench water through a heat exchanger in the smoke outlet before it is evaporated to generate the steam needed. By so doing the temperature of the smoke is lowered as the water heats up. As this happens, particularly in incinerator applications, the fly ash present will tend to act as "seeds" for the moisture generated by the combustion of any hydrogenous material in the charge being burned. As a result, the effective size of the ash particles increases, thus reducing the amount of steam needed to hydrate and agglomerate the fly ash particles and making their capture and removal both more efficient and less expensive.

Thus, it it the object of the present invention to provide a scrubbing apparatus for the control of atmospheric pollution, emanating from smoke stacks, having means for the removal of solids.

It is a second object to provide a scrubbing apparatus which can operate continuously and without requiring frequent shutdown for cleaning and repair.

It is still another object to provide a scrubbing apparatus which is effective in removing acid oxides and odiferous gaseous compounds in the smoke.

It is a further object to provide a scrubbing apparatus which controls both solid and gaseous pollution emanatingfrom a smoke stack which is simple in construction and inexpensive to operate.

Other and further objects of the present invention will become apparent to those skilled in the art upon consideration of the following specifications when read in conjunction with the attached drawing.

BRIEF DESCRIPTION OF THE DRAWING

FIG. 1 is a cross section of a front elevation view of the present invention.

DESCRIPTION OF THE PREFERRED EMBODIMENT

Referring now to FIG. 1 we see pollution control apparatus 10. As shown it comprises a horizontal closed boxlike housing having a top 12, a bottom 14, a front side (not shown), a rear side (not shown), a left end 18 and a right end 20, so that the box is completely enclosed. In the embodiment illustrated, each of these elements are substantially perpendicular to each other. Within the box are a set of three internal walls, 22, 24, and 26, substantially parallel to the ends and perpendicular to the sides, top and bottom, which sub-divide the box into four internal chambers 28, 30, 32 and 34. The basic structure of the box and walls can be made from common and inexpensive structural materials such as carbon steel with a stainless steel liner, if needed, to handle particularly corrosive gases. Additionally, insulation may be added, if desired.

The size of the structure will vary according to the particular application and vary accordingly to the volume of smoke being scrubbed, the degree of pollution and the degree of scrubbing desired. In one embodiment of the invention each chamber is a minimum of 4 ft. $\times$ 4 ft. $\times$ 16 ft. in size. Size changes require no basic changes in design.

The location of the apparatus is also not critical, but generally should be as close to the source of the fumes being treated as possible. One reason for this is to be able to use the sensible heat of the exiting smoke to preheat the water required for the steam scrub, which will subsequently be described. Another reason for such a location, especially where one is scrubbing the output of an incinerator in which a fairly large amount of evaporated moisture, resulting from the combustion of hydrogenous materials in the basic charge, is present, is to allow the fly ash and soot present to act as "seeds" for any water which might tend to condense out as the smoke is cooled. This tends to cause them to agglomerate, thus increasing the effective size of the soot and fly ash particles and making their subsequent removal much easier.

Looking now in detail at chamber 28, we see that the gas inlet 36 is located substantially in the center of the portion of top 12 which lies over chamber 28. This is downstream from the source of the smoke being treated (not shown) and any heat exchanger (also not shown) which might be present.

Directly below opening 38 in roof 12 is a hollow triangular baffle 40. This creates a pair of approximately one foot wide channels 41 which act to split the incoming smoke stream into two substreams. As this happens each of these substreams is penetrated by a steam spray coming from a set of manifolds 42 directly below opening 38 in the upper corners of chamber 28, and having a plurality of jets or nozzles 44 directed at a 45 degree angle which are substantially perpendicular to the substream flow path. Directly underneath baffle 40 is a second set of steam manifolds 42 which further inject steam at right angles to the smoke exiting from channels 41. To provide maximum effectiveness, wet or at best saturated steam at a temperature of about 360° F. (150 pounds of pressure) should be used. To provide the necessary quantities of steam, manifolds 42 should be 2 to 3 inches in diameter. For maximum dispersion efficiency, nozzles 44 should be of the fan spray type and be directed at 90° to the smoke stream flowing past them.

The steam serves several purposes. First, it hydrates the fly ash and soot present causing it to agglomerate and form larger particles. This continues the process started in the upstream heat exchanger, if one was present. Secondly, it reacts with any odiferous agents, such as mercaptans which are frequently present in incinerator smoke outputs, to hydrolyze them. This both acts to make them easier to remove and destroys much of their odor as well. Lastly, the steam starts the hydration of any sulfur dioxide, sulfur trioxide, phosphorous trioxide, nitrogen oxides and other acidiferous contaminents in the smoke. This tends to reduce their volatility by a considerable margin which makes them much more readily condensable and easier to scrub out of the smoke stream.

It should be noted that wall 22 does not quite extend to reach bottom 14. Rather, it stops about one foot short of the bottom to create opening 46 which acts as the inlet to chamber 30. At the bottom of both of these chambers is a common water sump 48 which is about 2 to 3 inches deep. This depth is created by elevated drain pipes 50 which lead from these chambers and discharge into a common collection manifold 52. The sump acts to collect any larger particles or drops of fluids which have condensed or settled out of the smoke stream in either of these two chambers. These discharges are combined in manifold 52 with the liquid discharges from chambers 32 and 34 for filtration, neutralization and eventual reuse in the system.

Both of these chambers contain a water inlet 54 which provides the initial sump charge and to provide any additional water which may be needed. This can be controlled automatically by a float valve or similar level adjusting device (not shown). Additional water may be periodically added, as needed, to remove pollutants which become suspended in the water. To maintain effectiveness of the system, the water in sump 48 should be completely changed periodically to remove any particles which could not be otherwise removed.

Chamber 30 has a relatively large substantially oval shaped baffle 56 which extends diagonally from chamber inlet 46 to chamber outlet 58 which is located at the top of wall 24. As with baffle 40, it creates a pair of channels 60 each of which is about one foot wide. Gas flow is further channeled by a pair of streamliners 62 located in the upper left and lower right corners of chamber 30.

The process of hydration is completed by a third pair of steam manifolds 42 and their nozzles 44 which are also set to inject steam substantially perpendicular to the flow paths of the two substreams around baffle 56. They are placed so that the steam also impinges directly onto baffle 56 which is water cooled and acts to condense some portion of the steam along with a quantity of the agglomerated fly ash and hydrolyzed acid oxides. This constitutes a first scrubbing action. The condensed material drains into sump 48 for removal by drains 50 and drain manifold 52. The exiting cooling water from baffle 56, which by now is considerably warmer than when it entered it, can be used as boiler feed for the steam spray, thus providing for additional fuel economy and operating efficiency.

Chamber 32 is essentially a mirror image of chamber 30, at least as far as its general physical layout is concerned. When the hydrated gas stream enters the chamber through outlet 58, it is subjected to a water medium quench stream from spray nozzles 64 connected to a pair of water manifolds 66. The flow is directed straight down and there are a sufficient quantity of spray nozzles 64, along each of the manifolds 66, that essentially all of the smoke is quenched. The water is at a pressure of about 100 pounds so most of it flows directly down channel 72 between wall 24 and the hollow oval shaped baffle 68 into sump 70. This constitutes a second scrubbing action and removes a large percentage of solid contaminents and higher molecular weight hydrated acids present. There is, however, an appreciable amount of water which is swept along with the gas as it flows into channels 72. As the gas flows through chamber 32, this water has time to combine with some of the remaining fly ash and odiferous and acidiferous gaseous contaminents not yet scrubbed out, before it settles out onto the upper surface of baffle 68. Still another scrubbing action occurs with a water spray from the second and third water manifolds 66 which are directed down across gas outlet 76, in chamber 32 and in chamber 34. These two sprays acting together remove essentially all of the solid and soluble odiferous and acidiferous contaminents remaining in the smoke. They also cool the smoke considerably which helps reduce thermal as well as chemical pollution of the environment.

Chamber 34 is basically a large open volume which is designed primarily to allow any swept water from the sprays to drop back into sump 70 which, as shown, is shared between chambers 32 and 34. The design and operation of sump 70 is the same as sump 48.

The temperature of the quenched gas is monitored by a thermocouple 78 or similar measuring device located just below gas outlet 80 in roof 12. If it is too high a fourth water manifold 66 located on right end 20 sprays across chamber 34 to wall 26 at a point just below cantilevered spray baffle 82. This provides for extra cooling power without allowing too much water to be blown by fan 84 out of stack 86.

In units being built to OSHA requirements there is an automatic variable damper 88 which, in normal operation acts in conjunction with a pressure sensor 90 to keep the system pressure from fluctuating as operating conditions change. It is normally set to open full when boiler purges are required to ventilate the system before initiating combustion or fixing the system. In normal use the quantity and temperature of smoke can vary over fairly wide ranges according to the operating conditions of the incinerator or other source involved. Furthermore, the velocity of the gas changes considerably as it enters into the relatively roomy interior of chamber 28, the velocity being a function of both gas quantity and temperature. As a result, the steam hydration and water quench times required will also vary according to changes in the gas velocity. Without some means to regulate the systems gas velocity, serious losses in efficiency and increases in operating costs can occur. Fan 84 serves to prevent this from happening by providing such regulation through the creation of a positive draft inside the chambers to effectively propel the gas through them with a proper operating velocity range. In more advanced systems having damper 88, efficiency is further enhanced since it controls system pressure so that even higher hydration and quench efficiencies can be achieved.

All of the quench water from sump 70 flows via elevated drains 50 into manifold 54. This in turn leads to a catch tank or basin (not shown) which allows the heavier particles of fly ash to settle out. Lighter particles, many of which, such as soot, will float, can be removed by filtration. When this is done it is found that the filter cake often contains a very high percentage of combustable material which after drying can be used either as a part of the fuel for the steam generator required or recycled with the incinerator charge to further reduce the volume of material which must be disposed.

It should also be noted that while the wash water tends to be acidic, the fly ash is made up largely of basic oxides and silicates. These can react with the acids present to neutralize most, if not all, of them. As a result, the filtrate tends to be neutral or only slightly acidic so it can be recycled for the liquid quench without difficulty. Where the water is needed as feed for the steam generator, only a relatively minor treatment will be needed to upgrade it to the water quality level needed for this purpose. Since steam loss has been found to be from 7 to 12 percent, depending on the size of the unit, this is an important factor in keeping costs low.

Basic operating costs can further be kept reduced by a number of relatively simple measures. The steam generator can be placed inside the incinerator to utilize the waste heat generated therein. Similarly, keeping the catch basin fairly large will increase both the acid/base reaction time and allow cleaning the filter and, if a plate and frame filter is used, changing the plates without shutting down the system. In fact, the system, as described, requires vertually no maintenance. Except for relatively rare need to replace the nozzles in the steam and water manifolds and to change the water in sumps 48 and 70, the unit can operate continuously for very long periods of time.

The particular scrubber system described herein can be applied to many different types of systems ranging from low sulfur gas burning boilers through trash incinerators to blast furnaces. As configured it conforms to OSHA standards for use with oil and gas units. Thus it is apparent that there has been provided, in accordance with the present invention, an apparatus for reducing air pollution which fully satisfies the objects and advantages set forth above.

The present invention may be embodied in other specific forms without departing from the spirit or essential attributes thereof and accordingly reference should be made to the appended claims taken in conjunction with the foregoing specification and drawing as indicating the scope of the invention.

What is claimed is:

1. A scrubbing apparatus, for removing solid particulate and soluble gaseous contamination from smoke and similar gases, comprising:
    a hydration chamber having, an inlet to receive the smoke, and a hydration means contained within said first chamber to cause said particulate contamination to hydrate and agglomerate thereby permitting it to act as condensation seeds; and
    a quench chamber for providing a first scrubbing action, including water cooled baffle means therewithin having inlet means for feeding cool water thereto and outlet means for discharging heated water therefrom, adapted to receive the smoke from said hydration chamber, having a quench means contained therein, and an outlet whereby said agglomerated particles and soluble gaseous contamination are scrubbed out and removed from the smoke prior to discharge into said outlet; and
    chamber means for providing a second scrubbing action, including baffle means therewithin, said baffle means being positioned and dimensioned to be a substantial mirror image of said water cooled baffle means; and
    pressure differential means operably connected to the apparatus to cause said smoke to flow through said inlet to said outlet.

2. The apparatus of claim 1 wherein said pressure differential means is a fan.

3. The apparatus according to claim 2 wherein said hydration means is low pressure saturated steam which is admitted into said hydration chamber by a steam manifold contained within said hydration chamber having connected thereto a plurality of spray nozzles directed so as to be substantially perpendicular to the flow of said gas in said chamber.

4. The apparatus of claim 3 wherein said quench means comprises a quench medium of water which is admitted into said quench chamber by water contained within said quench chamber having connected thereto a plurality of spray nozzles directed to be substantially perpendicular to the flow of the hydrated gas in said quench chambers.

5. The apparatus of claim 4 wherein said quench means further comprises, a temperature sensor which monitors the outlet gas temperature, and a second quench manifold, including a plurality of spray nozzles, which is activated by said sensor if the outlet gas temperature exceeds preset limits, thereby admitting additional cooling water to further reduce outlet gas temperature.

6. The apparatus of claim 2 which further includes a filter and sumps located in the bottom of said hydration and quench chambers, said filter being adapted to filter discharged fluids from said sumps.

7. The apparatus of claim 6 wherein said fan further includes a variable damper adapted to keep system pressure from fluctuating as operating conditions vary.

8. A scrubbing apparatus for removing solid and soluble gaseous contaminents from smoke and similar gases comprising:

a housing including a top, a bottom, a front side and a rear side, a first end and a second end, said sides and said ends being placed essentially mutually perpendicular to each other and to said top and bottom, said housing being subdivided by a plurality of inner walls parallel to said ends and extending between said sides and substantially from said top to said bottom into;

a first chamber lying between the first end and a first internal wall and further comprising a contaminated gas inlet located in the top thereof, baffle means adapted to cooperate with said inlet to channel and direct said gas past a first steam spray means located beneath said inlet at an angle to said baffle means and then past a second spray means beneath said baffle, said spray being directed to be substantially perpendicular to the channeled gas flow whereby the gas is hydrated for scrubbing, and a first gas outlet in the bottom portion of said first internal wall;

a second chamber lying between the first internal wall, and a second internal wall, adapted to receive the hydrated gas from said first chamber and further comprising water cooled baffle means situated so as to direct said incoming gas past a third steam spray means which in turn are directed to impinge on said water cooled baffle means whereby a partial steam condensation and first scrubbing action occurs, said condensate flowing to the bottom of said chamber, a water filled sump in the bottom of said chamber extending between said sides and through said first gas outlet into said first chamber, said sump further comprising a water inlet for initial liquid charge and make up which is adapted to operate in said first and second chambers and through which the condensate is removed from said chambers while at the same time maintaining the sump water level, and a second gas outlet in the upper portion of said second internal wall through which the partially scrubbed gas exits;

a third chamber lying between said second internal wall, and a third internal wall including baffle means positioned and dimensioned therewithin to be a substantial mirror image of said water cooled baffle means; said third chamber being adapted to receive the partially scrubbed gas from said second chamber and further comprising a first water quench means whereby the gas stream is cooled and the steam, hydrated solid contaminents and soluble gases are condensed and collected thus achieving a second scrubbing, said scrubbed condensate flowing along with said quench water to the bottom of said chamber, a drain in the bottom of said chamber to remove the quench water and condensate and a third gas outlet in the bottom of said third internal wall through which the cooled scrubbed gas stream is discharged;

a fourth chamber lying between said third internal wall and said second end, adapted to receive the cooled gas stream from said third chamber and further comprising a second quench water means adapted to perform a final scrubbing and cooling of said gas stream, a gas discharge in the top of said chamber from which the cooled cleaned gas exits the system, said discharge further comprising fan means and being constrictable by a variable damper contained therein so as to keep system gas velocity and pressure even, a third water quench means adapted to only operate when the temperature of the existing gas exceeds a preset level, cantilevered baffle means to prevent spray from the second and third quenches from being swept out of said gas outlet and a water filled sump in the bottom of said chamber extending between said sides and through said third gas outlet into said third chamber, said sump further comprising a water inlet for initial charge and makeup, which is adapted to cooperate with elevated drains in both the third and fourth chambers through which the contaminated condensate and quench water are removed from the system to maintain sump depth, and filter means adapted to receive the discharges from said sumps and further adapted to separate said solid contamination and said drained discharges whereby said solids are removed and the quench water salvaged for reuse.

* * * * *